(12) United States Patent
Nakazawa et al.

(10) Patent No.: US 12,084,840 B2
(45) Date of Patent: Sep. 10, 2024

(54) SYSTEM AND METHOD FOR WORK MACHINE

(71) Applicant: KOMATSU LTD., Tokyo (JP)

(72) Inventors: Koichi Nakazawa, Tokyo (JP); Osamu Yatsuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 23 days.

(21) Appl. No.: 17/289,766

(22) PCT Filed: Jan. 20, 2020

(86) PCT No.: PCT/JP2020/001696
§ 371 (c)(1),
(2) Date: Apr. 29, 2021

(87) PCT Pub. No.: WO2020/153292
PCT Pub. Date: Jul. 30, 2020

(65) Prior Publication Data
US 2021/0395980 A1    Dec. 23, 2021

(30) Foreign Application Priority Data

Jan. 23, 2019  (JP) .................................. 2019-008906

(51) Int. Cl.
*E02F 9/26* (2006.01)
*B60R 1/27* (2022.01)
(Continued)

(52) U.S. Cl.
CPC ................ *E02F 9/261* (2013.01); *B60R 1/27* (2022.01); *B60R 1/28* (2022.01); *H04N 5/265* (2013.01);
(Continued)

(58) Field of Classification Search
CPC ....... E02F 9/261; E02F 9/2228; E02F 9/2278; E02F 9/26; B60R 1/00; B60R 2300/105;
(Continued)

(56) References Cited

U.S. PATENT DOCUMENTS

| | | | |
|---|---|---|---|
| 2003/0085999 A1* | 5/2003 | Okamoto | .................. B60R 1/27 348/E7.086 |
| 2012/0069188 A1* | 3/2012 | Ohno | ..................... G08G 1/166 348/148 |

(Continued)

FOREIGN PATENT DOCUMENTS

| | | | | |
|---|---|---|---|---|
| CN | 105556956 B | * | 1/2019 | ............... B60R 1/00 |
| JP | 2011-81729 A | | 4/2011 | |

(Continued)

OTHER PUBLICATIONS

Examination report No. 1 for the corresponding Australian application No. 2020212836, issued on Nov. 24, 2021.
(Continued)

*Primary Examiner* — Richard A Hansell, Jr.
(74) *Attorney, Agent, or Firm* — Global IP Counselors, LLP

(57) ABSTRACT

A system includes a processor and a display. A plurality of cameras capture surroundings images of a work machine. The processor acquires image data indicative of the surroundings images. The processor synthesizes the surroundings images and generates a panorama moving image from viewpoints that move around the work machine. The display displays, based on a signal from the processor, the panorama moving image from the viewpoints that move around the work machine. The system may include the cameras and the work machine.

13 Claims, 11 Drawing Sheets

(51) Int. Cl.
  *B60R 1/28*   (2022.01)
  *E02F 9/22*   (2006.01)
  *H04N 5/265*  (2006.01)
  *H04N 7/18*   (2006.01)

(52) U.S. Cl.
  CPC ........ *H04N 7/181* (2013.01); *B60R 2300/105* (2013.01); *B60R 2300/30* (2013.01); *B60R 2300/607* (2013.01); *E02F 9/2228* (2013.01); *E02F 9/2278* (2013.01)

(58) Field of Classification Search
  CPC .......... B60R 2300/30; B60R 2300/607; B60R 2300/303; B60R 2300/605; H04N 5/265; H04N 7/181; G03B 15/00; G03B 37/00; G06T 3/00
  See application file for complete search history.

(56) References Cited

U.S. PATENT DOCUMENTS

| | | | |
|---|---|---|---|
| 2016/0182823 A1* | 6/2016 | Murasumi | B60R 1/28 348/38 |
| 2016/0212384 A1* | 7/2016 | Sawada | G06T 15/04 |
| 2017/0050566 A1 | 2/2017 | Yamashita et al. | |
| 2017/0322624 A1* | 11/2017 | Niccolini | E02F 5/145 |
| 2018/0089907 A1* | 3/2018 | Maruoka | B60R 1/27 |
| 2018/0170259 A1* | 6/2018 | Maejima | H04N 23/63 |
| 2018/0281681 A1* | 10/2018 | Sunohara | B60R 1/27 |
| 2019/0218754 A1* | 7/2019 | Izumikawa | G06V 20/58 |
| 2022/0309803 A1* | 9/2022 | Morita | B60W 30/06 |

FOREIGN PATENT DOCUMENTS

| | | | |
|---|---|---|---|
| JP | 2013-121056 A | 6/2013 | |
| JP | 2014-69629 A | 4/2014 | |
| JP | 2015088942 A * | 5/2015 | ............. B60R 1/00 |
| JP | 2016-134001 A | 7/2016 | |
| WO | 2016/031009 A1 | 3/2016 | |
| WO | WO-2018084146 A1 * | 5/2018 | ............. B60K 35/00 |

OTHER PUBLICATIONS

The International Search Report for the corresponding international application No. PCT/JP2020/001696, issued on Mar. 24, 2020.

* cited by examiner

SYSTEM AND METHOD FOR WORK MACHINE

CROSS-REFERENCE TO RELATED APPLICATIONS

This application is a U.S. National stage application of International Application No. PCT/JP2020/001696, filed on Jan. 20, 2020. This U.S. National stage application claims priority under 35 U.S.C. § 119(a) to Japanese Patent Application No. 2019-008906, filed in Japan on Jan. 23, 2019, the entire contents of which are hereby incorporated herein by reference.

BACKGROUND

Field of the Invention

The present invention relates to a system and a method for a work machine.

Background Information

A system which displays a work machine and an image indicating the surroundings of the work machine is known in the prior art. For example, in International Publication No. WO 2016-031009, a system includes a plurality of cameras attached to a work machine, and a controller. The plurality of cameras capture images of the work machine and the surroundings thereof. The controller synthesizes a bird's-eye view image from the images captured by the plurality of cameras.

SUMMARY

As indicated above, the controller generates an image that indicates the work machine and the surroundings thereof by synthesizing the plurality of images captured by the cameras. Therefore, the controller is able to generate images from different viewpoints.

If an operator is able to glance over a wide range of the surroundings of the work machine with a display, the operator would be able to easily confirm the state of the surroundings of the work machine. However, the range that can be seen on the display is limited. As a result, in order to check a wider range, the operator needs to perform an operation to switch the viewpoints which is complicated. An object of the present disclosure is to provide a system and a method with which the operator can use a display to easily glance over a wide range of the surroundings of the work machine.

A system according to a first aspect includes a work machine, a plurality of cameras, a processor, and a display. The work machine includes a work implement. The plurality of cameras capture surroundings images of the work machine. The processor acquires image data indicative of the surroundings images. The processor synthesizes the surroundings images and generates a panorama moving image from viewpoints that move around the work machine. The display displays, based on a signal from the processor, the panorama moving image from the viewpoints that move around the work machine.

A method according to a second aspect is a method executed by a processor for displaying surroundings of a work machine including a work implement on a display. The method includes the following processes. A first process is acquiring image data indicative of surroundings images of the work machine. A second process is synthesizing the surroundings images and generating a panorama moving image from viewpoints that move around the work machine. A third process is displaying, on the display, the panorama moving image from the viewpoints that move around the work machine.

A system according to a third aspect includes a processor and a display. The processor acquires image data indicative of surroundings images of a work machine. The processor synthesizes the surroundings images and generates a panorama moving image from viewpoints that move around the work machine. The display displays, based on a signal from the processor, the panorama moving image from the viewpoints that move around the work machine.

In the present disclosure, a panorama moving image from viewpoints that move around the work machine is displayed on the display. As a result, the operator can use the display to easily glance over a wide range of the surroundings of the work machine

DETAILED DESCRIPTION OF EMBODIMENT(S)

Figure 1:
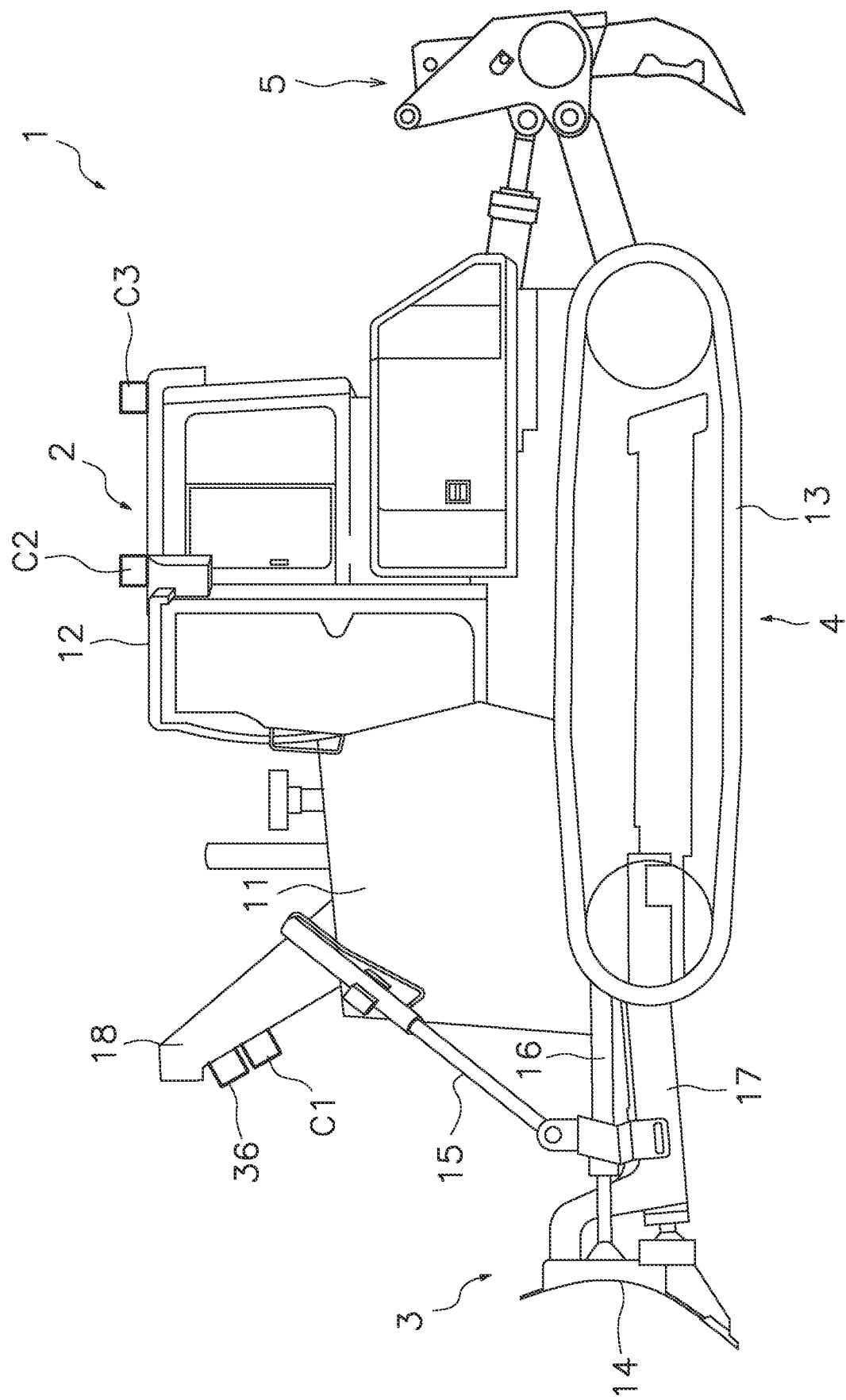
FIG. 1 is a side view of a work machine according to an embodiment.

The following is a description of a system for a work machine according to an embodiment with reference to the drawings. FIG. 1 is a side view of a work machine 1 according to the embodiment. The work machine 1 is a bulldozer according to the present embodiment. The work machine 1 includes a vehicle body 2, a work implement 3, and a travel device 4.

The vehicle body 2 includes an engine compartment 11. An operating cabin 12 is disposed behind the engine compartment 11. A ripper device 5 is attached to a rear part of the vehicle body 2. The travel device 4 is a device for causing the work machine 1 to travel. The travel device 4 includes a pair of crawler belts 13 disposed on the left and right sides of the vehicle body 2. The work machine 1 travels due to the crawler belts 13 being driven.

The work implement 3 is disposed in front of the vehicle body 2. The work implement 3 is used for work such as excavating, earth moving, or ground leveling. The work implement 3 has a blade 14, a lift cylinder 15, a tilt cylinder 16, and an arm 17. The blade 14 is supported on the vehicle body 2 via the arm 17. The blade 14 is configured to move in the up-down direction. The lift cylinder 15 and the tilt cylinder 16 are driven by hydraulic fluid discharged from a below mentioned hydraulic pump 22 and change the attitude of the blade 14.

Figure 2:
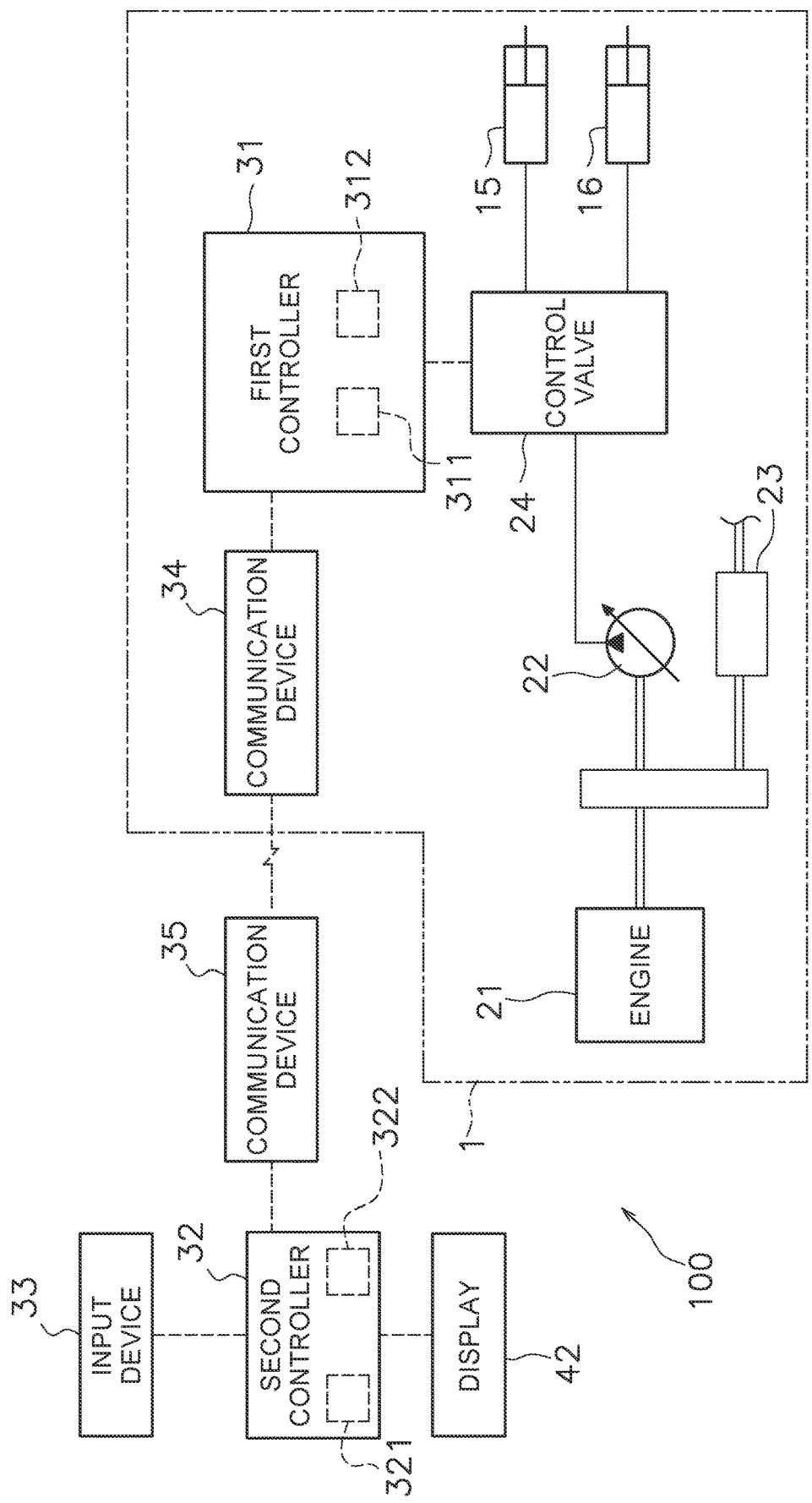
FIG. 2 illustrates a configuration of a system according to the embodiment.

FIG. 2 is a block diagram of a configuration of a system 100 for controlling the work machine 1. As illustrated in FIG. 2, the work machine 1 includes an engine 21, the hydraulic pump 22, a power transmission device 23, and a control valve 24. The engine 21, the hydraulic pump 22, and the power transmission device 23 are disposed in the engine compartment 11. The hydraulic pump 22 is driven by the engine 21 to discharge hydraulic fluid. The hydraulic fluid discharged from the hydraulic pump 22 is supplied to the lift cylinder 15 and the tilt cylinder 16. While only one hydraulic pump 22 is illustrated in FIG. 2, a plurality of hydraulic pumps may be provided.

The power transmission device 23 transmits the driving power of the engine 21 to the travel device 4. The power transmission device 23 may be a hydrostatic transmission (HST), for example. Alternatively, the power transmission device 23 may be, for example, a transmission having a torque converter or a plurality of speed change gears.

The control valve 24 is a proportional control valve and is controlled in accordance with an input instruction signal. The control valve 24 is disposed between the hydraulic pump 22 and hydraulic actuators such as the lift cylinder 15 and the tilt cylinder 16. The control valve 24 controls the flow rate of the hydraulic fluid supplied from the hydraulic pump 22 to the lift cylinder 15 and the tilt cylinder 16. The control valve 24 may also be a pressure proportional control valve. Alternatively, the control valve 24 may be an electromagnetic proportional control valve.

The system 100 includes a first controller 31, a second controller 32, an input device 33, and communication devices 34 and 35. The first controller 31 and the communication device 34 are mounted on the work machine 1. The second controller 32, the input device 33, and the communication device 35 are disposed outside of the work machine 1. For example, the second controller 32, the input device 33, and the communication device 35 may be disposed inside a control center separate from the work site. The work machine 1 can be operated remotely through the input device 33.

The first controller 31 and the second controller 32 are programmed to control the work machine 1. The controller 31 includes a memory 311 and a processor 312. The memory 311 includes, for example, a volatile memory such as a RAM and a non-volatile memory such as a ROM. The memory 311 stores programs and data for controlling the work machine 1. The processor 312 is, for example, a central processing unit (CPU) and executes processes for controlling the work machine 1 according to a program. The first controller 31 controls the travel device 4 or the power transmission device 23 thereby causing the work machine 1 to travel. The first controller 31 causes the work implement 3 to move by actuating the control valve 24.

The second controller 32 includes a memory 321 and a processor 322. The memory 321 includes, for example, a volatile memory such as a RAM and a non-volatile memory such as a ROM. The memory 321 stores programs and data for controlling the work machine 1. The processor 322 is, for example, a central processing unit (CPU) and executes processes for controlling the work machine 1 according to a program. The second controller 32 receives operation signals from the input device 33.

The input device 33 receives operations by an operator and outputs operation signals corresponding to the operations. The input device 33 outputs the operation signals to the second controller 32. The input device 33 includes operation elements such as an operating lever, a pedal, or a switch for operating the travel device 4 and the work implement 3. The input device 33 may include a touch panel. The travel of the work machine 1 such as forward travel or reverse travel is controlled in accordance with the operation of the input device 33. In addition, motions of the work implement 3 such as raising or lowering is controlled in accordance with the operation of the input device 33.

The second controller 32 is configured to communicate wirelessly with the first controller 31 via the communication devices 34 and 35. The second controller 32 acquires operation data D4 from the operation signals from the input device 33 and transmits the operation data D4 to the first controller 31. The operation data D4 represents operations of the input device 33 for operating the travel device 4 and the work implement 3. The first controller 31 controls the travel device 4 and the work implement 3 in accordance with the operation data D4.

Figure 3:
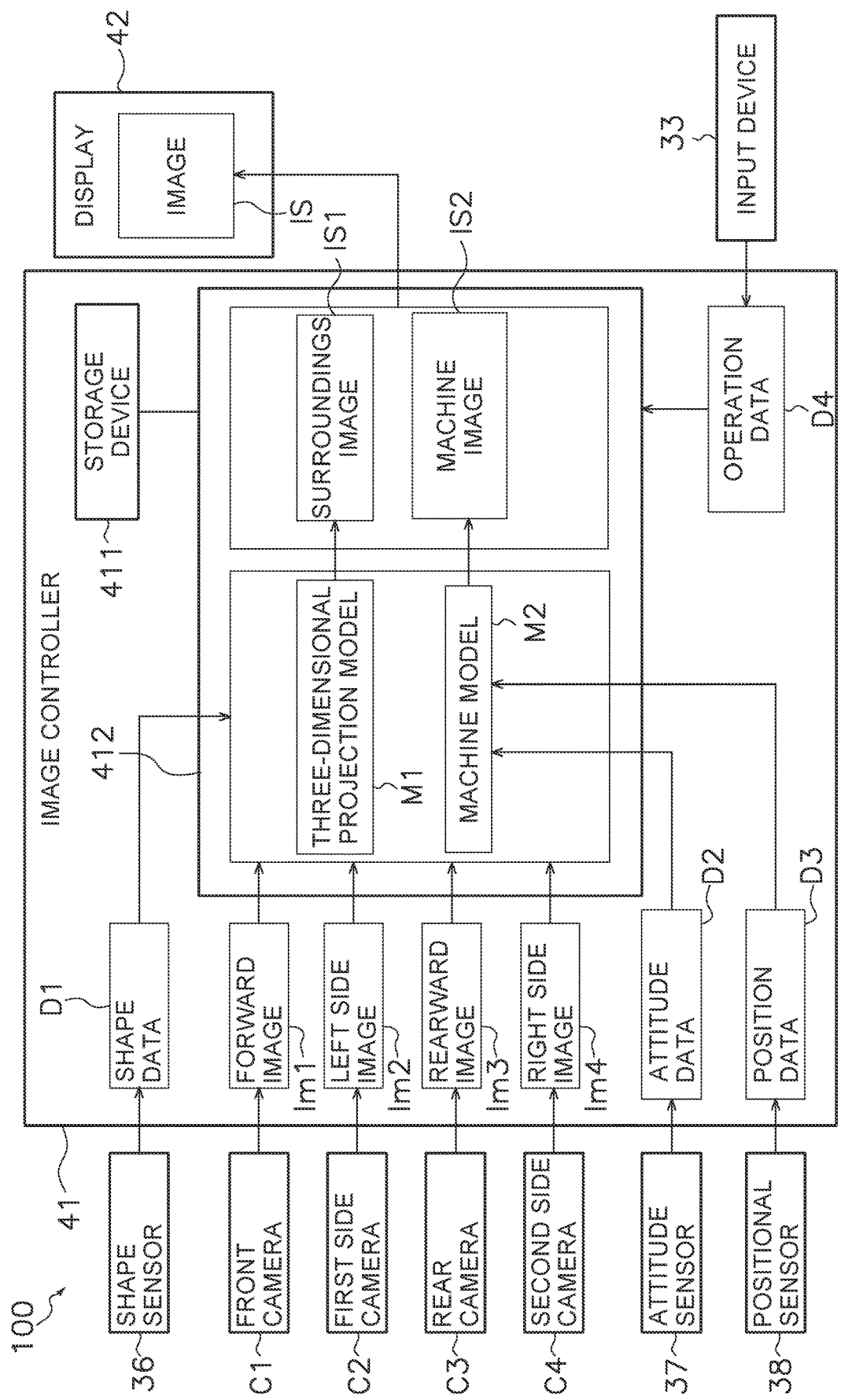
FIG. 3 is a block diagram illustrating a configuration of the system and a processing flow performed by the system.

FIG. 3 is a block diagram that illustrates a configuration of the system 100 for displaying the work machine 1 and surroundings images thereof, and illustrates a processing flow performed by the system. As illustrated in FIG. 3, the system 100 includes a plurality of cameras C1 to C4. The plurality of cameras C1 to C4 are attached to the vehicle body 2. The plurality of cameras C1 to C4 are fish-eye lens cameras. The angle of view of each of the plurality of cameras C1 to C4 is 180 degrees. However, the angle of view of each of the plurality of cameras C1 to C4 may be less than 180 degrees. Alternatively, the angle of view of each of the plurality of cameras C1 to C4 may be greater than 180 degrees. The plurality of cameras C1 to C4 include a front camera C1, a first side camera C2, a rear camera C3, and a second side camera C4.

As illustrated in FIG. 1, the front camera C1 is attached to a front part of the vehicle body 2. Specifically, the vehicle body 2 includes a supporting member 18 as illustrated in FIG. 1. The supporting member 18 extends upward and forward from the front part of the vehicle body 2. The front camera C1 is attached to the supporting member 18. The rear camera C3 is attached to a rear part of the vehicle body 2.

The first side camera C2 is attached to one side part of the vehicle body 2. The second side camera C4 is attached to the other side part of the vehicle body 2. In the present embodiment, the first side camera C2 is attached to a left side part of the vehicle body 2 and the second side camera C4 is attached to a right side part of the vehicle body 2. However, the first side camera C2 may be attached the right side part of the vehicle body 2, and the second side camera C4 may be attached the left side part of the vehicle body 2.

The front camera C1 acquires images in front of the vehicle body 2. The rear camera C3 acquires images to the rear of the work machine 1. The first side camera C2 acquires images on the left side of the vehicle body 2. The second side camera C4 acquires images on the right side of the vehicle body 2. The cameras C1 to C4 output image data which represents the acquired images.

The system 100 includes a shape sensor 36, an attitude sensor 37, and a positional sensor 38. The shape sensor 36 measures three-dimensional shape of an object surrounding of the work machine 1 and outputs shape data D1 which represents the three-dimensional shape. In the present embodiment, the shape sensor 36 is, for example, a LIDAR (laser imaging detection and ranging) device. The shape sensor 36 measures the distance to the measurement points by irradiating a laser and measuring the reflected light thereof.

The attitude sensor 37 detects the attitude of the work machine 1 and outputs attitude data D2 which represents the attitude. The attitude sensor 37 is, for example, an inertial measurement unit (IMU). The attitude data D2 includes the angle (pitch angle) relative to horizontal in the vehicle front-back direction and the angle (roll angle) relative to horizontal in the vehicle lateral direction. The attitude sensor 37 outputs the attitude data D2.

The positional sensor 38 is, for example, a global navigation satellite system (GNSS) receiver such as a global positioning system (GPS) or the like. The positional sensor 38 receives positioning signals from a satellite and acquires position data D3 which represents position coordinates of the work machine 1 from the positioning signals. The positional sensor 38 outputs the position data D3.

The shape sensor 36 is, for example, attached to the supporting member 18. Alternatively, the shape sensor 36 may be attached to another portion of the vehicle body 2. The attitude sensor 37 and the positional sensor 38 are attached to the vehicle body 2. Alternatively, the attitude sensor 37 and the positional sensor 38 may be attached to the work implement 3.

The system 100 includes an image controller 41 and a display 42. The image controller 41 is programmed to generate an image IS which depicts the work machine 1 and the surroundings thereof, and display the image IS on the display 42. The image controller 41 includes a storage device 411 and a processor 412. The storage device 411 includes, for example, a volatile memory such as a RAM and a non-volatile memory such as a ROM. The storage device 411 may include an auxiliary storage device such as an HDD or an SSD. The storage device 411 stores programs and data for generating the image IS. The processor 412 is, for example, a central processing unit (CPU) and executes processes for generating the image IS and displaying the image IS on the display 42 in accordance with the programs.

The image controller 41 is communicably connected to the first controller 31 by wire or wirelessly. The image controller 41 is communicably connected to the second controller 32 by wire or wirelessly. The image controller 41 may be mounted on the work machine 1. The image controller 41 may be integrated with the first controller 31 or may be a separate item.

Alternatively, the image controller 41 may be disposed outside the work machine 1. For example, the image controller 41 may be disposed inside the control center. The image controller 41 may be integrated with the second controller 32 or may be a separate item.

The image controller 41 is communicably connected to the cameras C1 to C4 by wire or wirelessly. The image controller 41 receives the image data from the cameras C1 to C4. Alternatively, the image controller 41 may receive the image data through the first controller 31 and/or the second controller 32.

The image controller 41 is communicably connected to the shape sensor 36, the attitude sensor 37, and the positional sensor 38 by wire or wirelessly. The image controller 41 receives the shape data D1 from the shape sensor 36. The image controller 41 receives the attitude data D2 from the attitude sensor 37. The image controller 41 receives the position data D3 from the positional sensor 38. Alternatively, the image controller 41 may receive the shape data D1, the attitude data D2, and the position data D3 through the first controller 31 and/or the second controller 32.

The image controller 41 receives the operation data D4 from the input device 33. Alternatively, the image controller 41 may receive the operation data D4 through the first controller 31 and/or the second controller 32.

The display 42 is a device such as a CRT, and LCD, or an OLED. However, the display 42 is not limited to the aforementioned displays and may be another type of display. The display 42 displays images based on signals from the image controller 41. The display 42 may receive the signals from the image controller 41 through the first controller 31 and/or the second controller 32.

Figure 4:
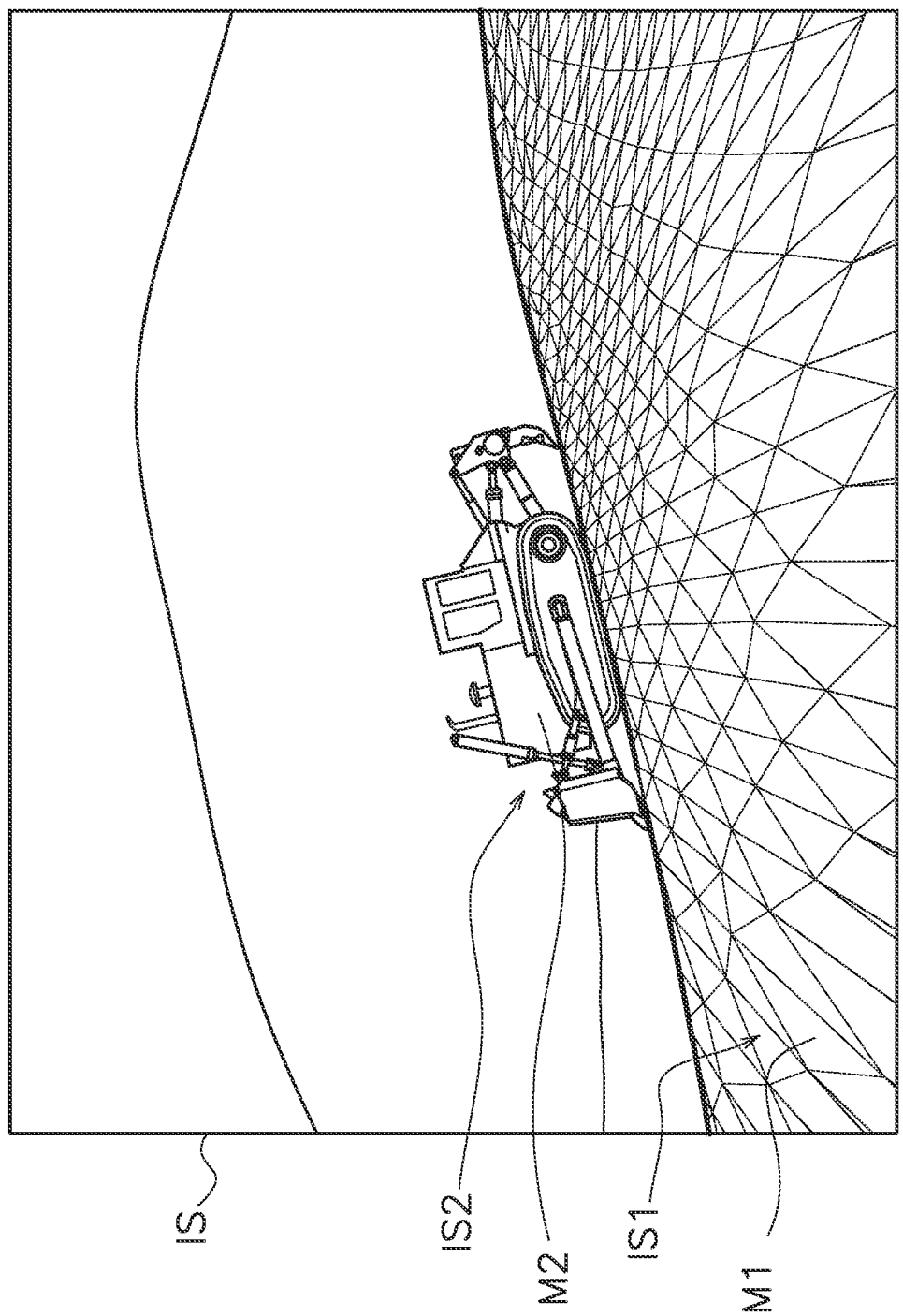
FIG. 4 illustrates an example of an image.

The image controller 41 generates the image IS based on the abovementioned image data, the shape data D1, the attitude data D2, and the position data D3. FIG. 4 illustrates an example of the image IS. The image IS includes the work machine 1 and an object of the surroundings thereof. The object surrounding the work machine 1 includes the topography surrounding the work machine 1. The object surrounding the work machine 1 may include another work machine, a building, or a person. The following is an explanation of the generation of the image IS.

First, the cameras C1 to C4 capture images of the work machine 1 and the surroundings thereof. Consequently, the image controller 41 obtains a forward image Im1, a left side image Im2, a rearward image Im3, and a right side image Im4 from the cameras C1 to C4 as illustrated in FIG. 3. The forward image Im1 is an image in front of the vehicle body 2. The left side image Im2 is an image to the left of the vehicle body 2. The rearward image Im3 is an image behind the vehicle body 2. The right side image Im4 is an image to the right of the vehicle body 2.

The image controller 41 generates a surroundings image IS1 from the images Im1 to Im4 acquired by the cameras C1 to C4. The surroundings image IS1 is a composite image which depicts the surroundings of the work machine 1 from a bird's-eye view. The image controller 41 generates the surroundings image IS1 by projecting the images Im1 to Im4 acquired by the cameras C1 to C4 onto a three-dimensional projection model M1 by texture mapping as illustrated in FIG. 4. The three-dimensional projection model M1 is configured with a polygon mesh which represents the shape of the object in the surroundings of the work machine 1. The image controller 41 may use a previously saved three-dimensional projection model M1. Alternatively, the image controller 41 may generate the three-dimensional projection model M1 based on the shape data D1 acquired from the shape sensor 36.

Next, the image controller 41 synthesizes a machine image IS2 which depicts the work machine 1 with the surroundings image IS1. The machine image IS2 is an image which depicts the work machine 1 itself in a three-dimensional manner. The image controller 41 determines the attitude of the machine image IS2 on the image IS1 from the attitude data D2. The image controller 41 determines the heading of the machine image IS2 on the image IS1 from the position data D3. The image controller 41 synthesizes the machine image IS2 in the image IS1 so that the attitude and the heading of the machine image IS2 on the image IS1 matches the actual attitude and heading of the work machine 1.

The image controller 41 may generate the machine image IS2 from the images Im1 to Im4 acquired by the cameras C1 to C4. For example, positions of the work machine 1 are included in the images acquired by the cameras C1 to C4, and the image controller 41 may generate the machine image IS2 by projecting the portions in the images onto a machine model M2. Alternatively, the machine model M2 may be a projection model having the shape of the work machine 1 and may be saved in the storage device 411. The machine image IS2 may be a previously captured image or may be a previously created three-dimensional computer graphic.

The display 42 displays the image IS. The display image IS is updated in real time and displayed as a video on the display 42. Therefore, when the work machine 1 is traveling, the surroundings image IS1 and the attitude, heading, and position of the machine image IS2 in the image IS are changed and displayed in real time in accordance with the changes of the object of the surroundings and the attitude, heading, and position of the work machine 1.

In order to reproduce the changes in the attitude, heading, and position of the work machine 1, the three-dimensional projection model M1 and the machine model M2 are rotated in accordance with a rotating matrix which represents the changes from the attitude, heading, and position when the work machine 1 started traveling. The three-dimensional projection model M1 and the machine model M2 are also translated in accordance with a translation vector. The rotation vector and the translation vector are acquired from the abovementioned attitude data D2 and the position data D3.

The method described in "Spatio-temporal bird's-eye view images using multiple fish-eye cameras," (Proceedings of the 2013 IEEE/SICE International Symposium on System Integration, pp. 753-758, 2013) for example, may be used as a specific method for synthesizing the images. The method described in "Visualization of the surrounding environment and operational part in a 3DCG model for the teleoperation of construction machines," (Proceedings of the 2015 IEEE/SICE International Symposium on System Integration, pp. 81-87, 2015) may also be used.

In FIG. 4, the image IS is an image of the work machine 1 and the surroundings thereof as seen from the left side. However, the image controller 41 is configured to switch the image IS to an image of the work machine 1 and the surroundings thereof as seen from a viewpoint in front, in the rear, on the right side, or above, or from an oblique viewpoint from any of the directions.

Figure 5A:
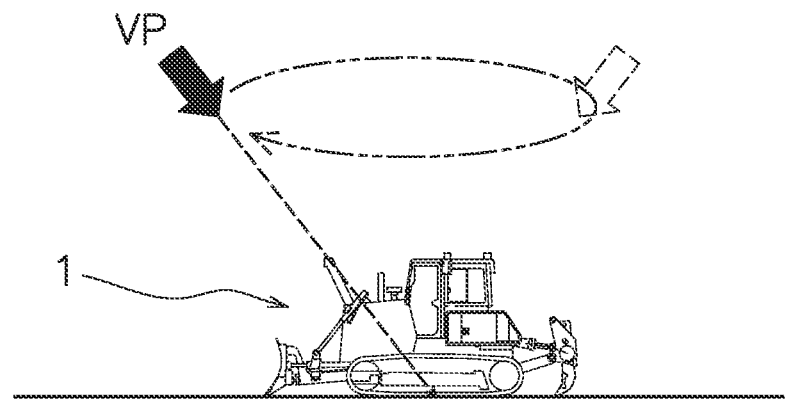
FIG. 5A and FIG. 5B illustrate movements of viewpoints in a panorama moving image.
Figure 5B:
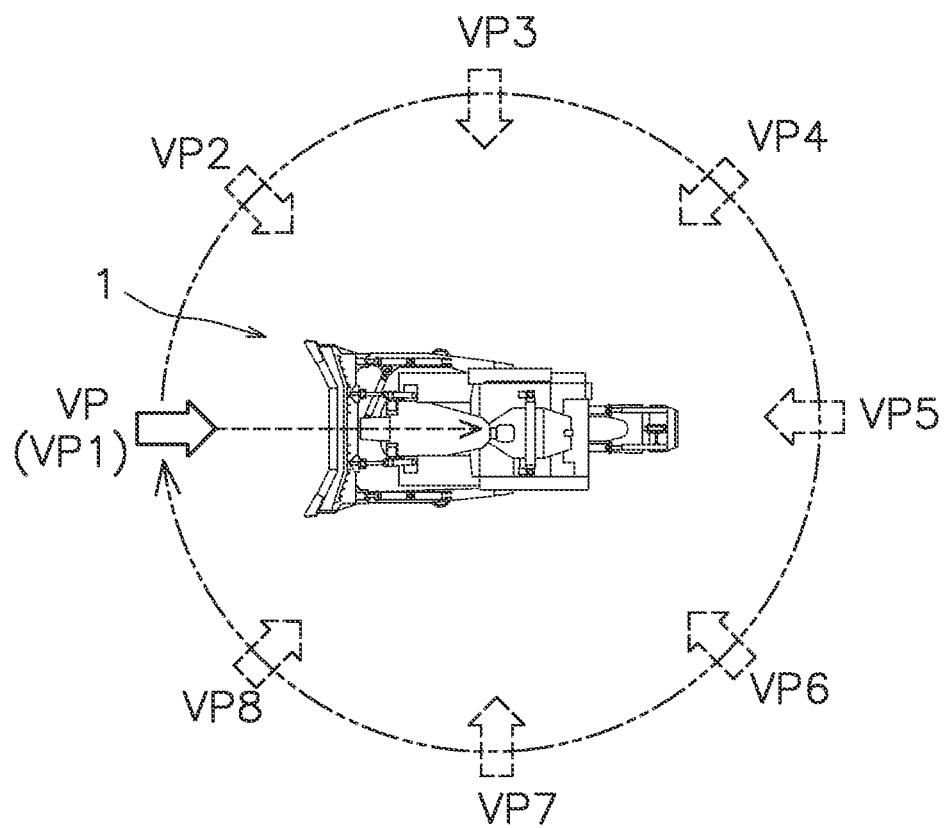

In addition, the image controller 41 generates a panorama moving image from viewpoints VP that move around the work machine 1, and displays the panorama moving image on the display 42. FIG. 5A is a side view of the movement of the viewpoints W. FIG. 5A is a top view of the movement of the viewpoints W. As illustrated in FIG. 5A, the viewpoints VP are positioned above and obliquely to the work machine 1. As illustrated in FIG. 5B, the image controller 41 causes the viewpoints VP to rotate 360 degrees around the work machine 1. The image controller 41 causes the viewpoints VP to rotate one time along a circular locus centered on the work machine 1. The viewpoints VP are constantly disposed facing the work machine 1.

Figure 6:
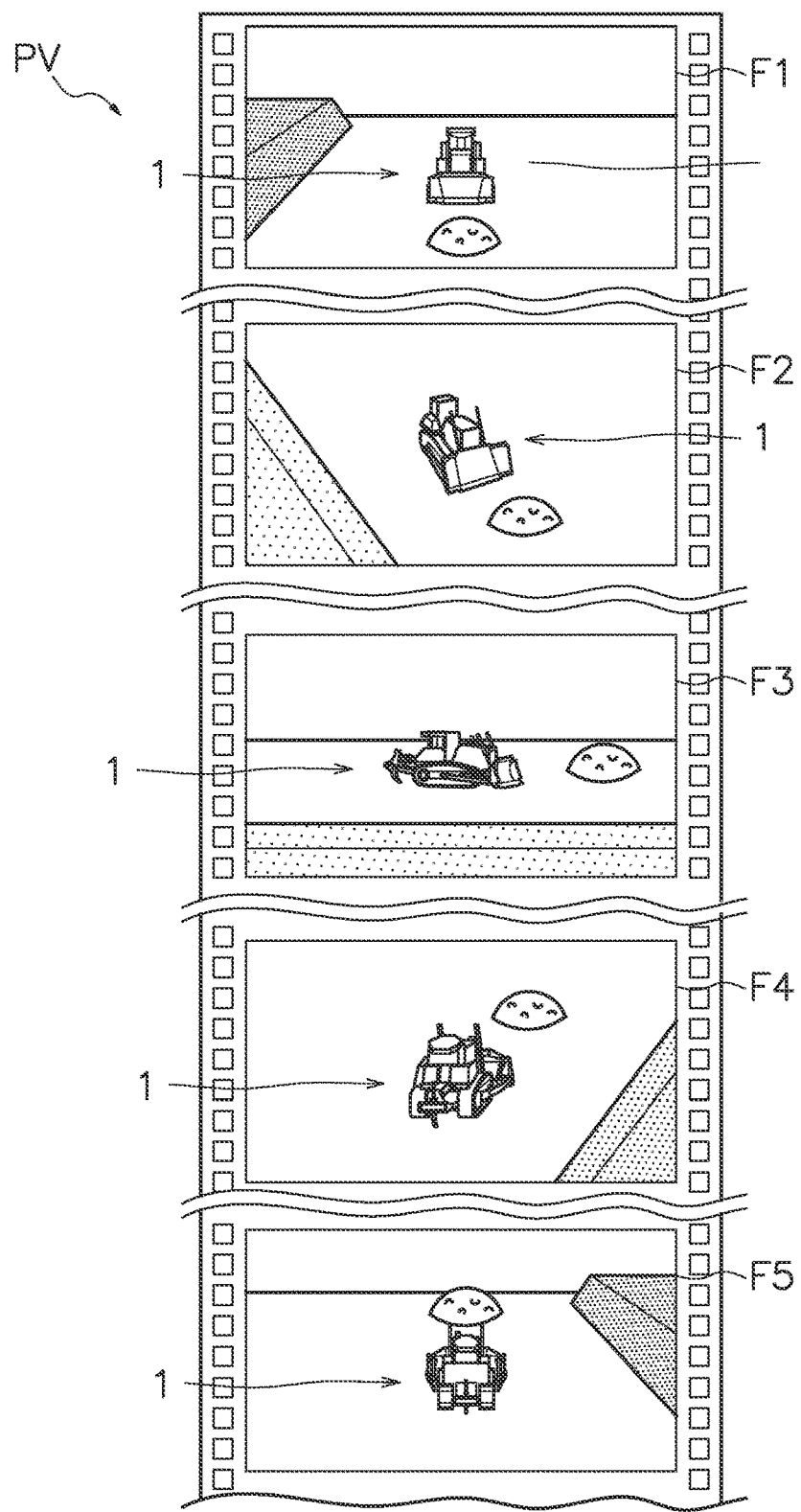
FIG. 6 illustrates portions of frames of the panorama moving image.
Figure 7:
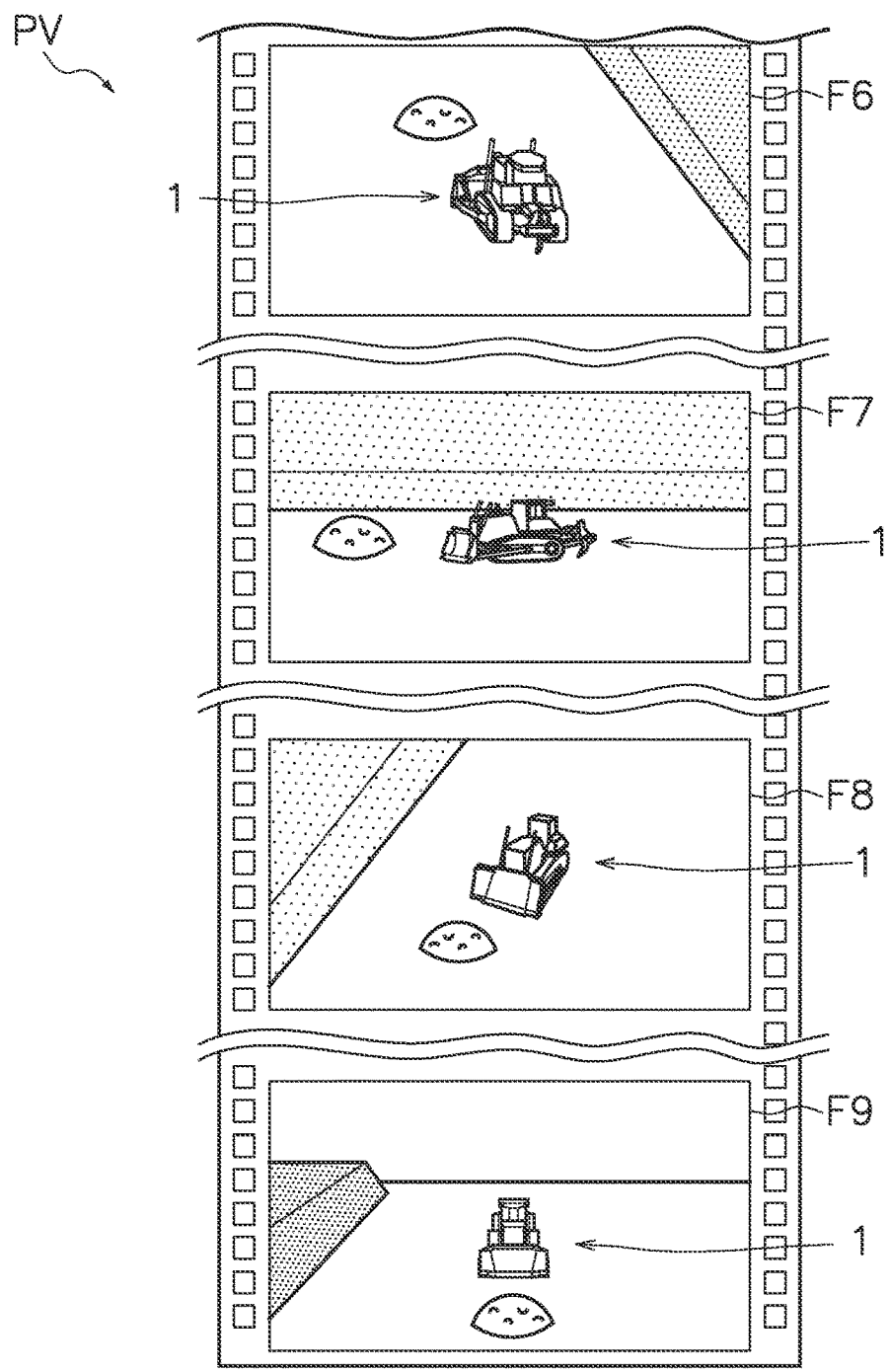
FIG. 7 illustrates portions of frames of the panorama moving image.

FIGS. 6 and 7 illustrate portions of frames of a panorama moving image PV. As illustrated in FIGS. 6 and 7, the work machine 1 is displayed in the center of the images in the panorama moving image PV. The panorama moving image PV depicts the work machine 1 and the surroundings over the entire circumference of the work machine 1.

Specifically, the work machine 1 is depicted in the center in the left-right direction of the images in the panorama moving image PV. The work machine 1 is depicted in the center in the up-down direction of the images in the panorama moving image PV. However, the work machine 1 may be depicted shifted from the center in the left-right direction or the up-down direction in the images.

A frame F1 illustrated in FIG. 6 is an image viewing the work machine 1 and the surroundings thereof from the viewpoint VP1 illustrated in FIG. 5B The viewpoint VP1 is positioned in front of and above the work machine 1. A frame F2 illustrated in FIG. 6 is an image viewing the work machine 1 and the surroundings thereof from the viewpoint VP2 illustrated in FIG. 5B. The viewpoint VP2 is positioned in diagonally forward and to the right and above the work machine 1. A frame F3 illustrated in FIG. 6 is an image viewing the work machine 1 and the surroundings thereof from the viewpoint VP3 illustrated in FIG. 5B. The viewpoint VP3 is positioned to the right and above the work machine 1.

A frame F4 illustrated in FIG. 6 is an image viewing the work machine 1 and the surroundings thereof from the viewpoint VP4 illustrated in FIG. 5B. The viewpoint VP4 is positioned in diagonally rearward and to the right and above the work machine 1. A frame F5 illustrated in FIG. 6 is an image viewing the work machine 1 and the surroundings thereof from the viewpoint VP5 illustrated in FIG. 5B. The viewpoint VP5 is positioned to the rear and above the work machine 1.

A frame F6 illustrated in FIG. 7 is an image viewing the work machine 1 and the surroundings thereof from the viewpoint VP6 illustrated in FIG. 5B. The viewpoint VP6 is positioned in diagonally rearward and to the left and above the work machine 1. A frame F7 illustrated in FIG. 7 is an image viewing the work machine 1 and the surroundings thereof from the viewpoint VP7 illustrated in FIG. 5B. The viewpoint VP7 is positioned in diagonally forward and to the left and above the work machine 1. A frame F9 illustrated in FIG. 7 is an image viewing the work machine 1 and the surroundings thereof from the viewpoint VP1 illustrated in FIG. 5B.

As described above, the viewpoints VP start moving from the start point VP1 and return to the start point VP1 after passing through viewpoints VP2 to VP8. The panorama moving image PV is generated continuously while moving the viewpoints VP1 to VP9 and the positions between each of the viewpoints. The starting position of the movement of the viewpoints VP is not limited to the viewpoint VP1 and may be another position.

The image controller 41 generates the panorama moving image PV and causes the panorama moving image PV to be displayed on the display 42 when a starting signal of the work machine 1 is received. In addition, the image controller 41 saves the data which represents the panorama moving image PV in the storage device 411. The image controller 41 receives, for example, the starting signal of the work machine 1 as the operation data D4 from the abovementioned input device 33. The starting signal of the work machine 1 is, for example, a signal for starting the engine 21. Alternatively, the starting signal of the work machine 1 may be a signal for starting the system of the work machine 1.

In the system 100 according to the present embodiment explained above, the panorama moving image PV is displayed on the display 42 from viewpoints PV that move around the work machine. As a result, the operator can easily use the display 42 to glance over a wide range of the surroundings of the work machine 1.

The panorama moving image PV is generated at the starting time of the work machine 1 and is displayed on the display 42. As a result, the operator is able to check the state of the surroundings of the work machine 1 when starting the work to be performed by the work machine 1.

The panorama moving image PV is saved in the storage device 411. Consequently, the panorama moving image PV can be saved as a safety record of the work site.

While an embodiment of the present disclosure has been described above, the present invention is not limited to the embodiment and the following modifications may be made within the scope of the present invention. For example, the work machine is not limited to a bulldozer and may be another type of work machine such as a wheel loader or a hydraulic excavator.

Figure 8:
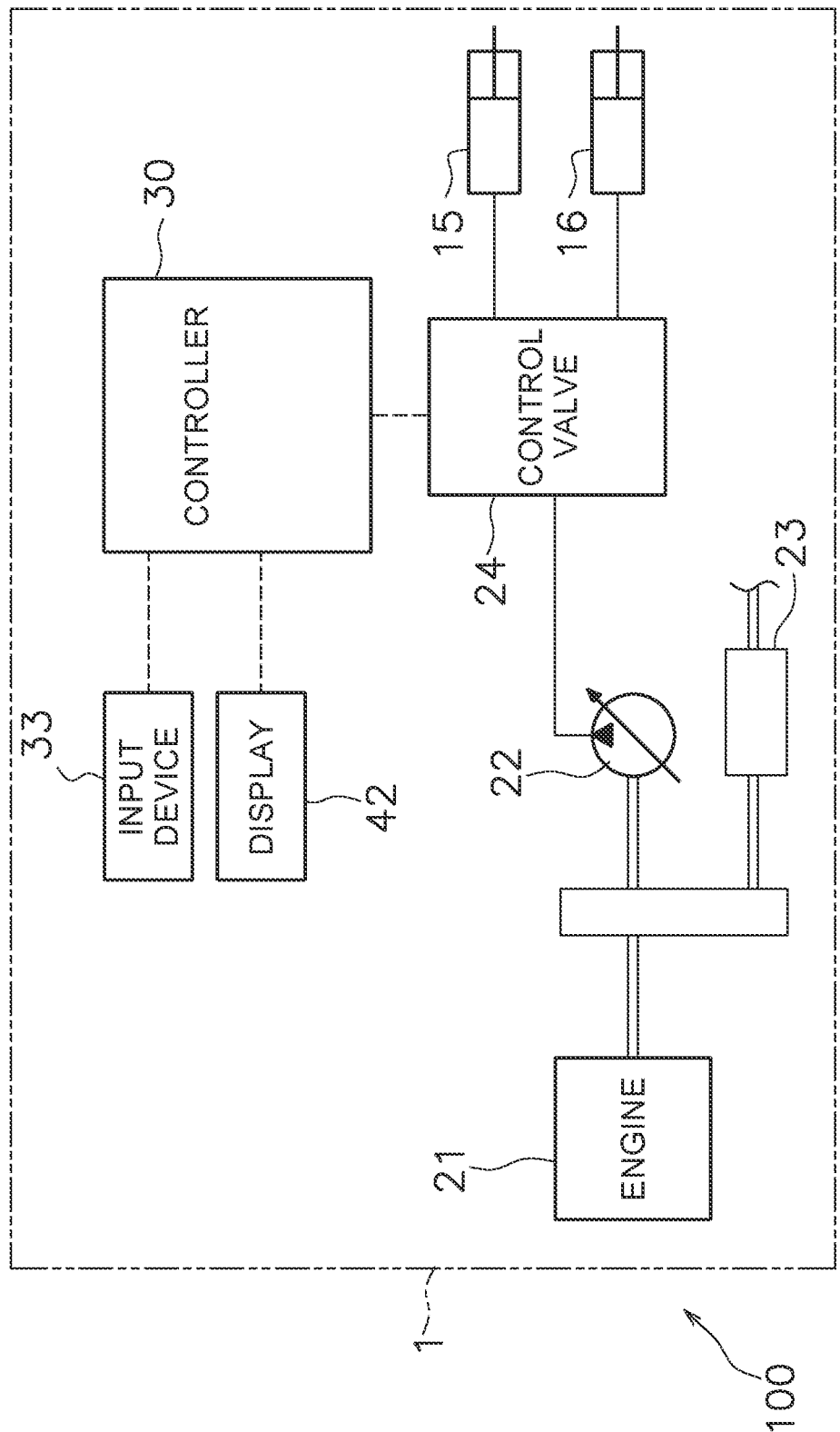
FIG. 8 illustrates a configuration of the system according to another embodiment.

The work machine 1 may be operated from inside the operating cabin and not remotely. FIG. 8 illustrates a configuration of the work machine 1 according to another embodiment. As illustrated in FIG. 8 the work machine 1 may include a controller 30 mounted to the work machine 1. In this case, the input device 33 may be disposed inside the operating cabin. The controller 30 may execute processing for generating the abovementioned images IS and the panorama moving image PV. The controller 30 has the same configuration as the abovementioned first controller 31 or the second controller 32 and therefore a detailed explanation will be omitted.

The first controller 31 is not limited to one unit and may be divided into a plurality of controllers. The second controller 32 is not limited to one unit and may be divided into a plurality of controllers. The controller 30 is not limited to one unit and may be divided into a plurality of controllers. The image controller 41 is not limited to one unit and may be divided into a plurality of controllers.

A portion or all of the abovementioned processes for generating the images IS may be executed by another controller instead of the image controller 41. A portion or all of the processes for generating the abovementioned panorama moving image PV may be executed by another controller instead of the image controller 41.

The number of the cameras is not limited to four and may be three or less or five or more. The cameras are not limited to fish-eye lens cameras and may be a different type of camera. The dispositions of the cameras are not limited to the dispositions indicated in the above embodiment and may be disposed differently.

The attitude sensor 37 is not limited to an IMU and may be another sensor. The positional sensor 38 is not limited to a GNSS receiver and may be another type of sensor. The shape sensor 36 is not limited to a LIDAR device and may be another measuring device such as a radar.

The panorama moving image PV may be generated at another timing and displayed on the display 42, and the generation of the panorama moving image PV is not limited to the time that the starting signal of the work machine is received. For example, the operator may operate the input device 33 thereby generating the panorama moving image PV at any timing so that the panorama moving image PV is displayed on the display 42.

The positions and orientations of the viewpoints VP in the panorama moving image PV are not limited to the positions and orientations of the above embodiment and may be changed. For example, the viewpoints VP may be the same height as the work machine 1. Alternatively, the viewpoints VP may be moved so that the work machine 1 is displayed in a position shifted from the center of the image.

FIG. 8A is a side view illustrating the movements of the viewpoints VP according to a modified example. FIG. 8B is a side view illustrating the movements of the viewpoints VP according to the modified example. As illustrated in FIG. 8A, the viewpoints VP in the modified example are positioned obliquely above the work machine 1 in the same way as the above embodiment. As illustrated in FIG. 8B, the controller 30 causes the viewpoints VP to move along an oval locus that surrounds the work machine 1 as seen from above the work machine 1 and generates the panorama moving image PV in the modified example.

The viewpoints VP are disposed in orientations that do not pass over the work machine 1. The viewpoints VP are disposed in orientations that pass on the left or right side of the work machine 1 facing the work machine 1. In the present modified example, the viewpoints VP are disposed in orientations that pass on the left side of the work machine 1 facing the work machine 1. However, the viewpoints VP may be disposed in orientations that pass on the right side of the work machine 1 facing the work machine 1.

Figure 9A:
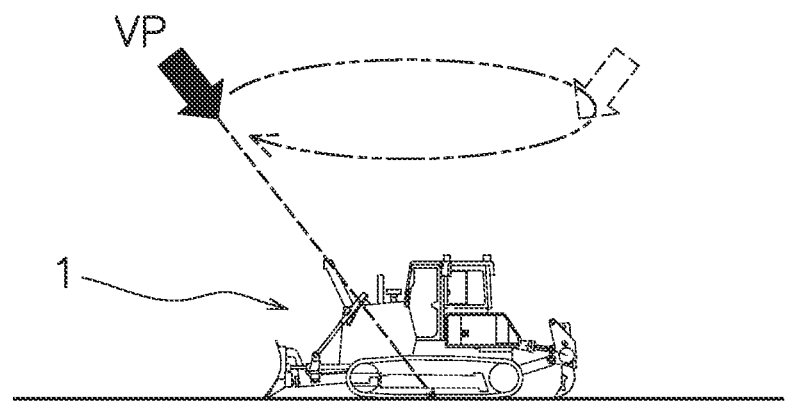
FIG. 9A and FIG. 9B illustrate the movements of the viewpoints in the panorama moving image according to a modified example.
Figure 9B:
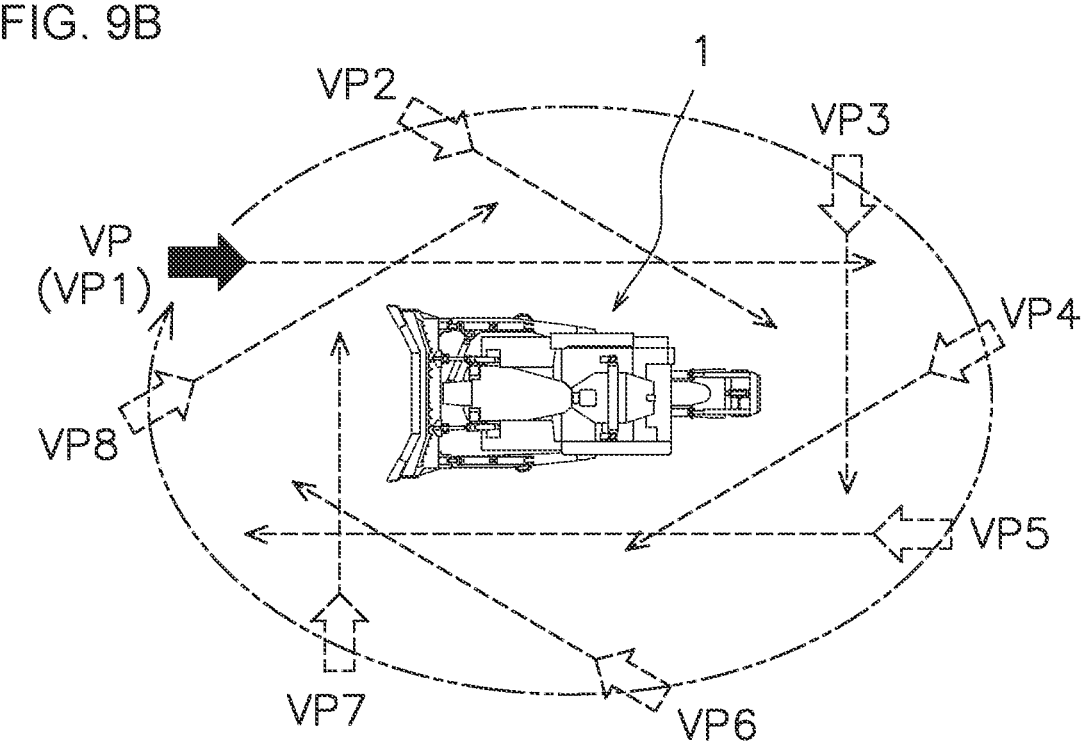
Figure 10:
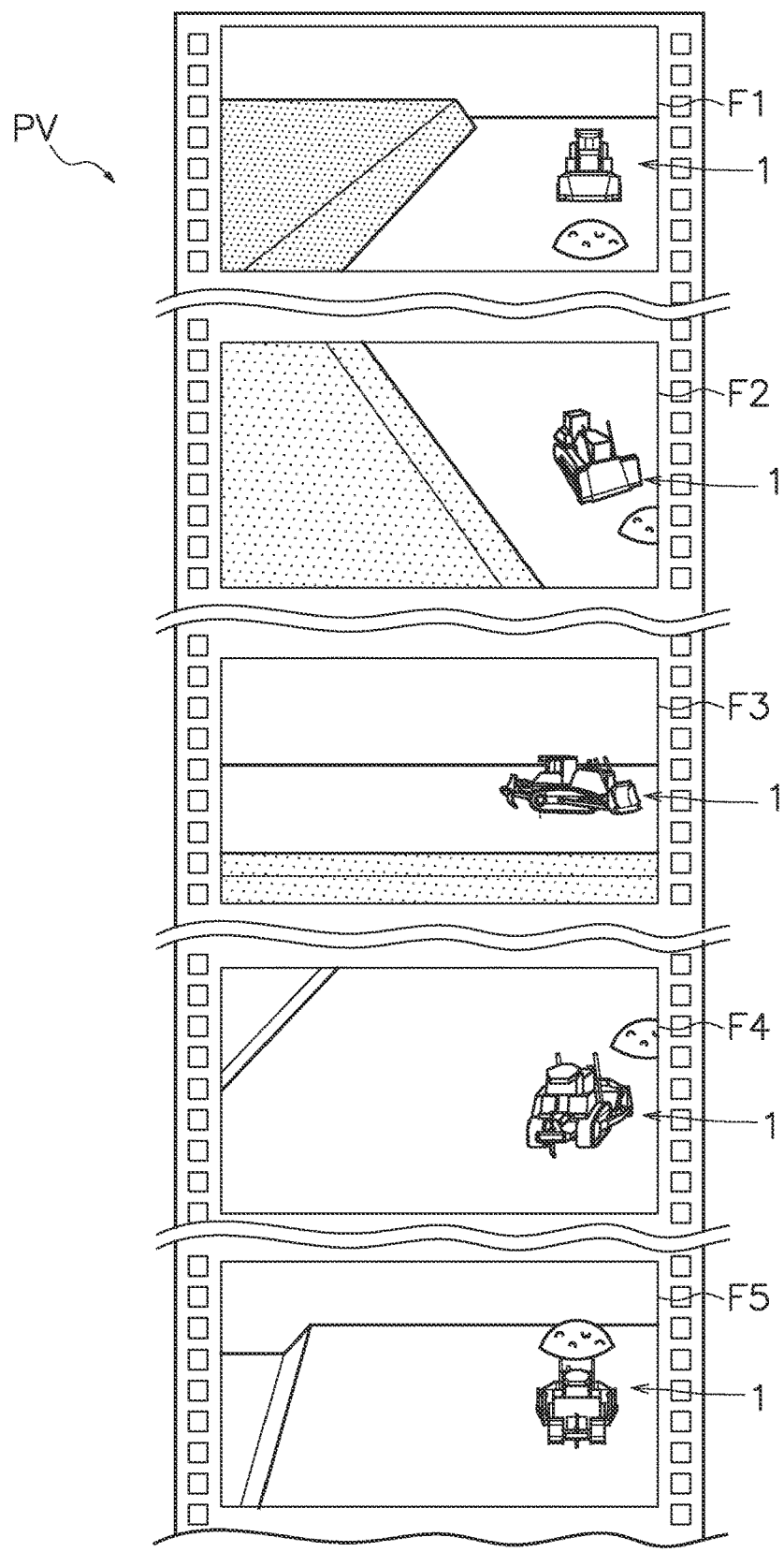
FIG. 10 illustrates portions of frames of the panorama moving image according to the modified example.

FIG. 9A, FIG. 9B and FIG. 10 illustrate portions of frames of the panorama moving image PV according to the modified example. As illustrated in FIG. 9A, FIG. 9B and FIG. 10, the work machine 1 is displayed further to the right than the center of the images in the panorama moving image PV. However, the work machine 1 may be displayed further to the left than the center of the images.

The frame F1 illustrated in FIG. 10 is an image viewing the work machine 1 and the surroundings thereof from the viewpoint P1 illustrated in FIG. 9B. The frame F2 illustrated in FIG. 10 is an image viewing the work machine 1 and the surroundings thereof from the viewpoint VP2 illustrated in FIG. 9B. The frame F3 illustrated in FIG. 10 is an image viewing the work machine 1 and the surroundings thereof from the viewpoint VP3 illustrated in FIG. 9B. The frame F4 illustrated in FIG. 10 is an image viewing the work machine 1 and the surroundings thereof from the viewpoint VP4 illustrated in FIG. 9B. The frame F5 illustrated in FIG. 10 is an image viewing the work machine 1 and the surroundings thereof from the viewpoint VP5 illustrated in FIG. 9B.

Figure 11:
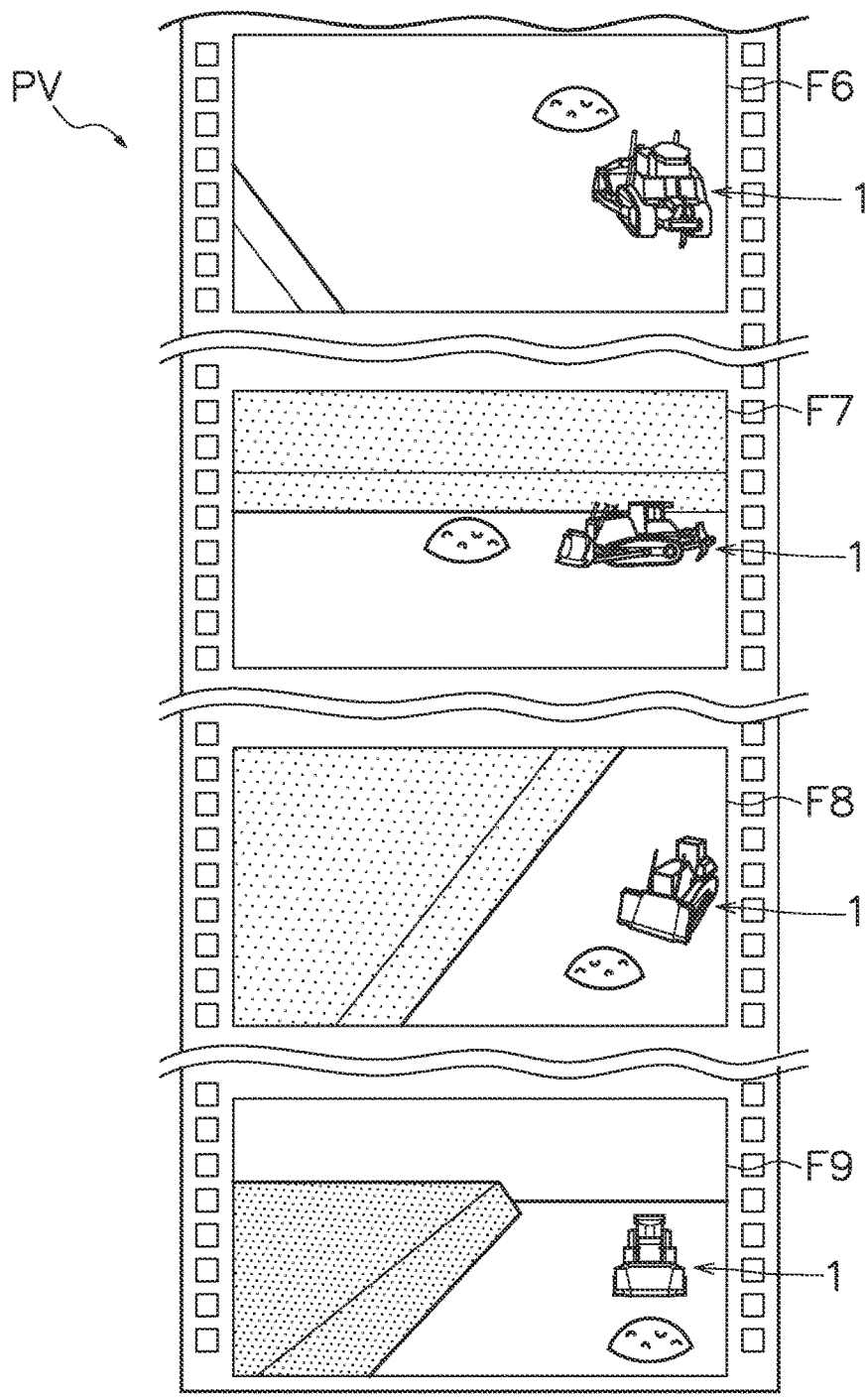
FIG. 11 illustrates portions of frames of the panorama moving image according to the modified example.

The frame F6 illustrated in FIG. 11 is an image viewing the work machine 1 and the surroundings thereof from the viewpoint VP6 illustrated in FIG. 9B. The frame F7 illustrated in FIG. 11 is an image viewing the work machine 1 and the surroundings thereof from the viewpoint VP7 illustrated in FIG. 9B. The frame F9 illustrated in FIG. 11 is an image viewing the work machine 1 and the surroundings thereof from the viewpoint VP1 illustrated in FIG. 9B.

As described above, the viewpoints VP start moving from the start point VP1 and return to the start point VP1 after passing through viewpoints VP2 to VP8. The panorama moving image PV is generated continuously while moving the viewpoints VP1 to VP9 and the positions between each of the viewpoints. The starting position of the movement of the viewpoints VP is not limited to the viewpoint VP1 and may be another position.

In the present disclosure, a panorama moving image from viewpoints that move around the work machine is displayed on the display. As a result, the operator can use the display to easily glance over a wide range of the surroundings of the work machine.

What is claimed is:

1. A system comprising:
a work machine including a work implement;
a plurality of cameras that capture camera images of surroundings of the work machine;
a display; and
a processor configured to
acquire the camera images of the surroundings,
synthesize the camera images,
generate a panorama moving image from viewpoints that move along a locus that surrounds the work machine as seen from above the work machine, all the viewpoints facing inward with respect to the locus at orientations that are offset leftward or rightward with respect to the work machine so as not to intersect the work machine in a top plan view; and transmit a signal to the display causing the display to display the panorama moving image from the viewpoints such that the work machine is displayed rightward or leftward of an image center in the panorama moving image.

2. The system according to claim 1, wherein
the processor is further configured to cause the viewpoints to rotate at least 360 degrees around the work machine to generate the panorama moving image.

3. The system according to claim 1, wherein
the processor is further configured to cause the viewpoints to move along a circular locus that surrounds the work machine as seen from above the work machine to generate the panorama moving image.

4. A system comprising:
a work machine including a work implement;
a plurality of cameras that capture camera images of surroundings of the work machine;
a display; and
a processor configured to
    acquire the camera images,
    synthesize the camera images,
    generate a panorama moving image from viewpoints that move along an oval locus that surrounds an exterior of the work machine as seen from above the work machine, all the viewpoints facing inward with respect to the oval locus at orientations that are offset leftward or rightward with respect to the work machine so as not to intersect the work machine in a top plan view; and
    transmit a signal to the display causing the display to display the panorama moving image from the viewpoints such that the work machine is displayed rightward or leftward of an image center in the panorama moving image.

5. The system according to claim 1, wherein
the panorama moving image depicts the surroundings of the work machine around an entire circumference of the work machine.

6. The system according to claim 1, wherein
the processor is configured to generate the panorama moving image and to display the panorama moving image on the display upon receiving a starting signal of the work machine.

7. The system according to claim 1, further comprising:
a storage device that stores data,
the processor is further configured to save the panorama moving image in the storage device.

8. A method executed by a processor for displaying surroundings of a work machine including a work implement on a display, the method comprising:
    acquiring camera images of the surroundings of the work machine;
    synthesizing the camera images and generating a panorama moving image from viewpoints that move along a locus that surrounds the work machine as seen from above the work machine, all the viewpoints facing inward with respect to the locus at orientations that are offset leftward or rightward with respect to the work machine so as not to intersect the work machine in a top plan view of the work machine; and
    displaying the panorama moving image from the viewpoints such that the work machine is displayed rightward or leftward of an image center in the panorama moving image.

9. The method according to claim 8, wherein
the generating the panorama moving image includes causing the viewpoints to rotate at least 360 degrees around the work machine.

10. The method according to claim 8, wherein
the generating the panorama moving image includes causing the viewpoints to move along a circular locus that surrounds the work machine as seen from above the work machine.

11. The method according to claim 8, wherein
the panorama moving image depicts the surroundings of the work machine around an entire circumference of the work machine.

12. The method according to claim 8, wherein
the panorama moving image is generated and displayed on the display upon receiving a starting signal of the work machine.

13. The method according to claim 8, further comprising:
saving the panorama moving image in a storage device.

* * * * *